United States Patent [19]

Wilson et al.

[11] 4,022,599
[45] May 10, 1977

[54] AIR CONDITIONING SYSTEM

[75] Inventors: Bobby L. Wilson; Thomas W. Earnheart, both of Grand Prairie, Tex.

[73] Assignee: A.R.A. Manufacturing Company, Grand Prairie, Tex.

[22] Filed: Sept. 22, 1975

[21] Appl. No.: 615,513

[52] U.S. Cl. .................. 62/244; 98/2.11; 165/41
[51] Int. Cl.² ........................................ B60H 3/04
[58] Field of Search ............. 98/2.11; 62/239, 244; 165/41, 42

[56] References Cited

UNITED STATES PATENTS

| | | | |
|---|---|---|---|
| 2,824,427 | 2/1958 | Baker | 98/2.11 |
| 3,444,700 | 5/1969 | Beyer | 62/244 |
| 3,757,851 | 9/1973 | Marble | 165/41 |
| 3,916,639 | 11/1975 | Atkinson | 62/244 |

*Primary Examiner*—Ronald C. Capossela
*Attorney, Agent, or Firm*—Cox, Smith, Smith, Hale & Guenther Incorporated

[57] ABSTRACT

The present invention shows an air conditioning system for use on an automobile. The compressor and condenser are located under the hood of the automobile with an evaporator being located inside of a console shaped assembly within the interior of the automobile. Intake louvers are located between the front seats with a blower forcing the air through a duct formed by the console over the transmission tunnel. The return air moves through an evaporator coil located within the console to refrigerate the air. The refrigerated air is then turned approximately 180° and discharged above the console area. Additional louvers for cooling the sides are optional.

7 Claims, 5 Drawing Figures

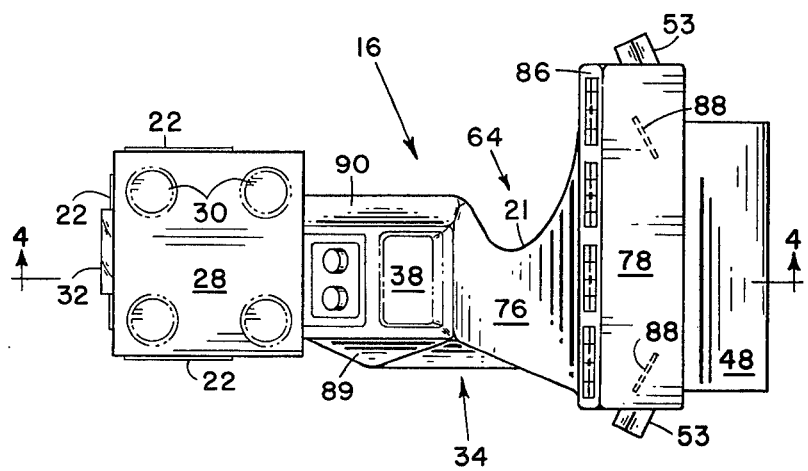
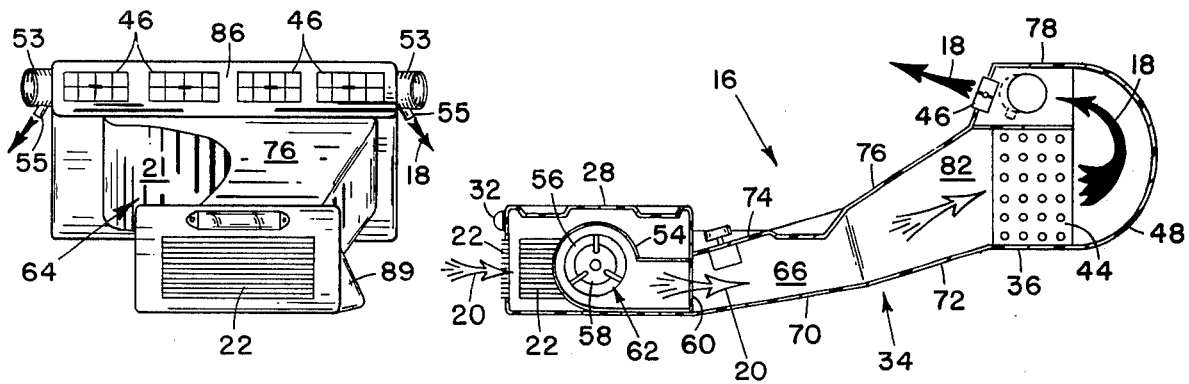

4,022,599

AIR CONDITIONING SYSTEM

BACKGROUND OF THE INVENTION

The present invention relates to air conditioners and, more particularly, an automobile air conditioner that can be included as original or after market equipment. The evaporator and blower section of the air conditioner are located in a console type assembly with the return air being drawn in between the front seats.

BRIEF DESCRIPTION OF THE PRIOR ART

Prior to the present invention the most common construction for automobile air conditioners was to have the majority of the components under the automobile hood with only the duct work and controls being located within the interior of the automobile. The duct work was normally located immediately below or within the dashboard of the vehicle.

Some air conditioning systems that were installed as after market equipment would locate the air conditioner immediately below the dash in the front center of the automobile. In any case the return air ducts for the air conditioning system, if recirculating the air contained in the automobile, are located forward of the refrigerated air discharge louvers. Many of the factory air installed systems have an optional control wherein the inside air may be recirculated, or outside air may be drawn in and refrigerated to cool the automobile.

SUMMARY OF THE INVENTION

It is an object of the present invention to provide an air conditioning system for automobiles for either factory installation or installation as after market equipment.

It is yet another object of the present invention to provide a unique duct system wherein the air to be refrigerated by the air conditioner is brought into the air conditioner system toward the rear interior of the automobile.

It is yet another object of the present invention to provide an air conditioning system having a console configuration with return air ducts being located between the front seats. The return air is directed forwardly and upwardly through the console and an evaporator coil before discharging above the console to cool the interior of the automobile.

In the present system component parts such as the compressor and condenser are located under the hood of the automobile with the evaporator being located in a console contained in the interior of the automobile above the transmission tunnel. An intake duct is located between the front seats of the automobile with a blower drawing air into the intake duct and forcing the air through a console shaped conduit and an evaporator coil located therein. By appropriate curving of the frontmost portion of the console, the air is directed through an approximate 180° turn and discharged above the console area. Additional baffles and louvers may be provided for discharging refrigerated air along each side of the front dash.

BRIEF DESCRIPTION OF THE DRAWINGS

FIG. 3 is a top view of FIG. 2.

FIG. 4 is a sectional view of FIG. 3 along section lines 4—4 with arrows indicating the air flow during normal operation of the air conditioner.

FIG. 5 is a front view of FIGS. 3 and 4.

DESCRIPTION OF THE PREFERRED EMBODIMENT

Figure 1:
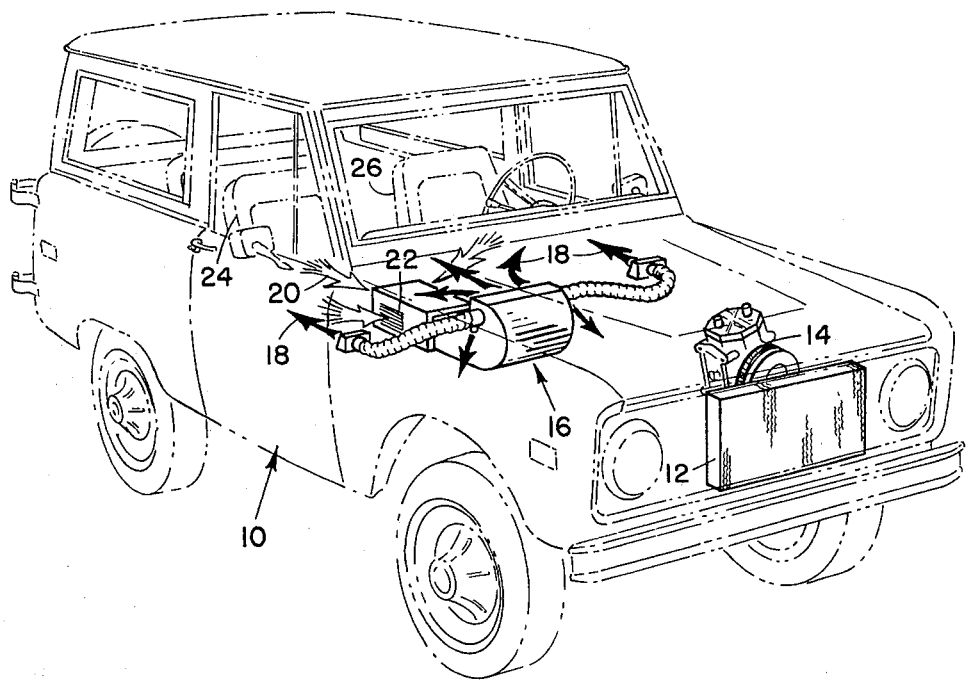
FIG. 1 is a perspective view of an automobile shown in broken lines with the components of an air conditioning system which embodies the present invention being superimposed upon the automobile.
Figure 2:
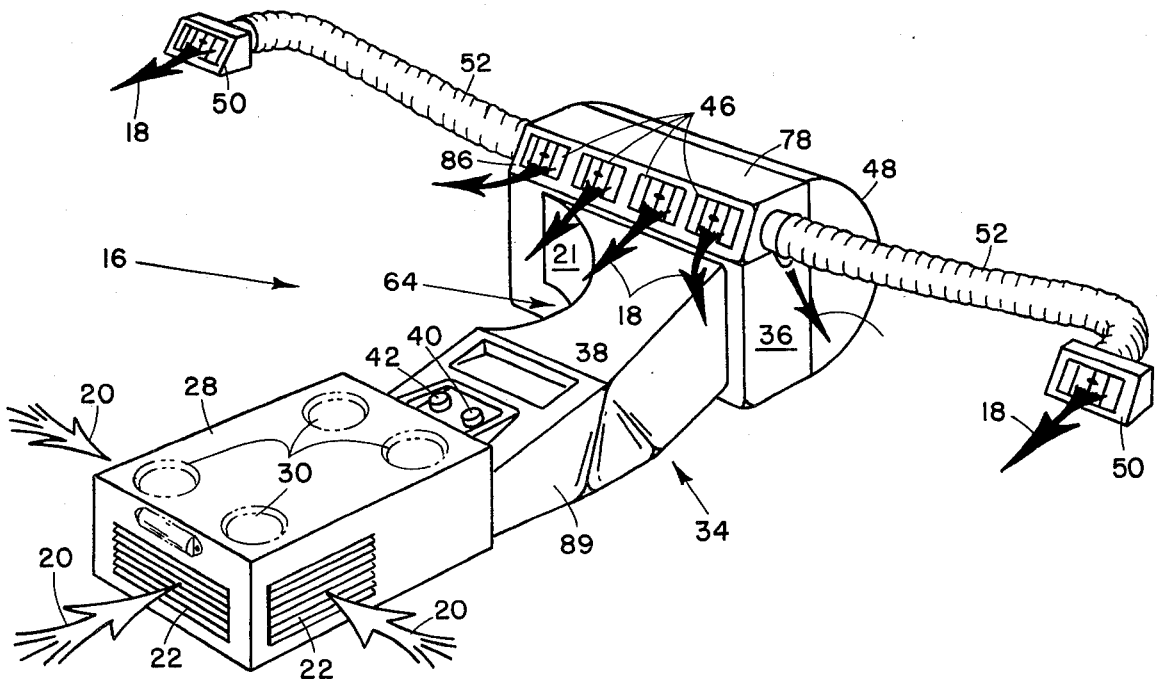
FIG. 2 is a perspective view of a center console portion of the present invention.

With reference to the drawings, and particularly to FIG. 1, an automobile is shown in broken lines and given a general reference designation 10. Shown in solid lines in conjunction with the automobile are components of an air conditioning system as they would be located and installed in the automobile. The condenser 12 and compressor 14 are installed under the hood of the automobile by conventional means commonly known in the art. A refrigerant feeds from the compressor 14 to condenser 12 and subsequently to an evaporator case assembly 16 which is located in the passenger compartment between the front seats 24 and 26 and above the top of the transmission tunnel of the automobile 10. The evaporator case 16 has a console style of construction as will be hereinafter described in detail. Refrigerant from the evaporator case assembly 16 feeds to the compressor 14 for repressurization. Portions of the air conditioning systems located under the hood of the automobile 10 are conventional and well known in the art. Suitable conduits and mounting brackets will be used for these components.

The following description will be devoted towards the novel aspects of the present invention involving the console type evaporator case assembly 16. By further referring to FIG. 1, it should be noted that refrigerated discharge air 18 is indicated by solid black arrows as is standard in the industry. However, for return air 20, it is indicated in white arrows as is also standard in the industry. A unique aspect of the present invention involves the location of the return air 20 forward of the direction of discharge of the refrigerated discharge air 18 and the evaporator 44 (subsequently described), or rearwardly in the automobile 10. The present method in the industry is to locate the return air ports under the dash and aft of the discharge outlets for refrigerated discharge air 18.

Referring more particularly to FIGS. 2–5 of the present invention, the return louvers 22 are positioned in a blower housing cover 28 located directly between front seats 24 and 26. The return air 20 comes from under the front seats 24 and 26 and from the back seat floor board area. Continuing towards the front of the automobile 10, a case generally referred to as duct assembly 34 is located between the blower housing cover 28 and evaporator case 36. The duct assembly 34 is constructed with a concave surface 21 to clear a floor gear shift arm (not shown) if used in automobile 10. Forward of duct assembly 34 is located the evaporator case 36 which houses evaporator coil 44 (see FIG. 4). A forward curved wall 48 curves through approximately 180° to reverse the direction of air flow. In the evaporator case 36 above the evaporator coil 44 is a louver housing 78 in which are located a number of louvers 46. The number of louvers 46 is determined by the capacity of the air conditioning system. Side louver outlets 50 are optional and may be connected by air ducts 52 to a port 53 on the louver housing 78. Ports 53 may also contain a small port 55 (see FIG. 5) to eject refrigerated air 18 to the leg and feet area of the front seats.

Enclosed in the blower housing cover 28 is a blower housing 54 that encases blower wheel 56 and blower motor 58, all of which are secured in position while allowing the free rotation of the blower wheel 56. The blower housing 54 directs the air being blown by blower wheel 56 through an opening in vertical wall 60 into a duct chamber 66 of duct assembly 34. As clearly shown in FIG. 4 the flow of return air 20 enters louvers 22, passes through blower venturi 62 into blower wheel 56 before being forced out the blower housing 54 into chamber 66. From chamber 66 the air flows into upwardly sloping duct chamber 82 and through evaporator coil 44. As the return air 20 flows through evaporator coil 44, it is cooled to give refrigerated air 18. The refrigerated air 18 is then curved through approximately 180° by curved front wall 48 and discharged through louvers 46, possibly including side louvers 50 and small port 55.

Referring back to the blower housing cover 28, it is basically rectangular shaped with the air louvers 26 being located on three sides and an opening in wall 60 on the fourth side for connecting with duct chamber 66. The top exterior portion of the blower housing cover 28 may contain suitable recesses 30 for holding cups or other items.

The duct assembly 34 which receives the air discharged from the blower wheel 56 has a slight incline shown by bottom wall 70. The incline of bottom wall 70 corresponds to the incline of the transmission tunnel. Above bottom wall 70 on the upper exterior portion of duct assembly 34 is located the controls including off-/on switch 42 and thermostat 40. The off/on switch 42 which is connected to the electrical system (not shown) of the automobile 10 controls the operation of the air conditioner including the blower motor 58 and the compressor 14. The thermostat 40, which may be of any suitable type, is used to control operation of the compressor 14, and may also control operation of the blower motor 58 depending upon the particular electrical design desired. Forward of the control portion, and still above bottom wall 70, is located a depression 38 that may be used to hold small items in the same manner as an upper depression on a conventional console.

Forward of bottom wall 70 is located incline wall 72 which angles upward at an even greater angle than bottom wall 70, again following the curvature of the transmission tunnel. The lower top portion 74 of the duct assembly 34 follows bottom wall 70 at a slightly increasing angle to increase the depth of the duct assembly 34. Likewise, duct top 76 follows incline wall 72, but at a greater angle, again increasing the depth of the duct assembly 34 prior to reaching evaporator case 36. At evaporator case 36 the return air moves substantially horizontally through the evaporator coil 44. The cross sectional area of the duct assembly 34 is approximately constant from the lower portion thereof until it terminates at evaporator case 36. The side walls 88 and 90 of the duct assembly 34 extend outwardly from the top to the bottom thereby resulting in the duct top 74 being narrower than bottom wall 70.

The evaporator case 36 is a rectangular box without a front and back wall with the evaporator 44 being located therein. Therefore, any air that flows through the evaporator case 36 must flow through evaporator coil 44 before being turned approximately 180° by curved wall 78. Air is then discharged out louvers 46 and 50 as previously described. The louver housing 78 is basically a rectangular shaped framing with the louvers 46 being located in a sloping wall 86. The louvers 46 are adjustable to direct the air in any desired direction. If side louvers 50 are connected, it may be necessary to install baffles 88 (see FIG. 3) to direct a sufficient volume of air to the side louvers 50.

Also included on the back wall of floor housing cover 28 is a courtesy light 32 that may be operated from the electrical system of the automobile 10. The courtesy light may have its individual on/off switch or may be connected to the interior lights for the automobile 10.

While the present invention has been described in conjunction with an automobile 10 that resembles a Ford Bronco, it should be understood that any type of automobile having sufficient space between the front seats, and having a transmission tunnel of a similar shape may use basically the same type of air conditioning system. The intake louvers should be located between the front seats with the evaporator being located in the console portion.

We claim:

1. An air conditioning system for an automobile having an engine, dash area, transmission tunnel and spaced apart front seats therein; said system including a compressor operated by said engine for pressurizing a refrigerant, a condenser for receiving said refrigerant from said compressor, said condenser feeding refrigerant through appropriate conduits to an evaporator, thereafter refrigerant flows back to said compressor, improvements comprising:

console means inside said automobile over said transmission tunnel extending from between said front seats to under said dash area, said console means enclosing said evaporator in a forward portion thereof;

air intake means located at a rear portion of said console means between said front seats;

blower means located in said console means for drawing air in said air intake means and forcing the air forwardly through said console means and said evaporator located therein to cool said air, cooled air being changed in direction of movement by a forward wall of said console and discharged toward the rear of said automobile through air outlet means under said dash area of said automobile.

2. The air conditioner as recited in claim 1 wherein said console means forms air conduits for said air conditioner.

3. The air conditioner as recited in claim 2 wherein said blower means is located between said air intake means and said evaporator, cooled air from said evaporator being discharged through said air outlet means above said console means.

4. The air conditioner as recited in claim 3 wherein the cross sectional area of console means from said blower means to said evaporator means in substantially constant with curved offsets in said console means thereby adapting said console means to allow for a floor shift in said automobile.

5. The air conditioner as recited in claim 1 wherein said console means has indentations in the top thereof for holding items therein.

6. The air conditioner as recited in claim 1 wherein said forward wall is curved to reverse direction of flow of said cooled air for discharge through louver means above said console means.

7. The air conditioner as recited in claim 6 wherein said louver means includes side louvers with hoses connecting thereto, said louvers and hoses being adapted to direct cooled air to the interior sides of said automobile.

* * * * *